(12) United States Patent
Huo et al.

(10) Patent No.: US 11,074,350 B2
(45) Date of Patent: Jul. 27, 2021

(54) METHOD AND DEVICE FOR CONTROLLING DATA RISK

(71) Applicant: ADVANCED NEW TECHNOLOGIES CO., LTD., Grand Cayman (KY)

(72) Inventors: Wenhu Huo, Hangzhou (CN); Chengwei Huang, Hangzhou (CN); Weiqiang Wang, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 391 days.

(21) Appl. No.: 16/234,267

(22) Filed: Dec. 27, 2018

(65) Prior Publication Data

US 2019/0130116 A1 May 2, 2019

Related U.S. Application Data

(63) Continuation of application No. PCT/CN2017/089958, filed on Jun. 26, 2017.

(30) Foreign Application Priority Data

Jul. 1, 2016 (CN) .......................... 201610512684.2

(51) Int. Cl.
*G06F 21/60* (2013.01)
*G16Z 99/00* (2019.01)
(Continued)

(52) U.S. Cl.
CPC ............ *G06F 21/60* (2013.01); *G06F 16/285* (2019.01); *G06Q 20/102* (2013.01); *G06Q 30/06* (2013.01); *G16Z 99/00* (2019.02)

(58) Field of Classification Search
USPC .......... 726/2, 21, 22, 36; 713/150, 163, 181; 380/255, 264, 276
See application file for complete search history.

(56) References Cited

U.S. PATENT DOCUMENTS 5,819,226 A * 10/1998 Gopinathan ........... G06Q 20/00
705/44
6,330,546 B1 12/2001 Gopinathan et al.
(Continued)

FOREIGN PATENT DOCUMENTS

| CN | 101976419 A | 2/2011 |
| CN | 102117459 A | 7/2011 |

(Continued)

OTHER PUBLICATIONS

Notice of Reasons for Rejection for Japanese Application No. 2018-568787, dated Jan. 7, 2020, 4 pages.
(Continued)

*Primary Examiner* — Sharif E Ullah (57) ABSTRACT

A method for data risk control comprises categorizing batch transaction data in a preset time period according to a first attribute, generating a graph indicator of a corresponding graph for each category of the batch transaction data according to a second attribute, the corresponding graph configured to identify risks in the batch transaction data, inputting the graph indicators corresponding to different categories of the batch transaction data into corresponding risk identification models, and determining whether the batch transaction data corresponding to the input graph indicators has a risk based on results output by the models. This scheme can quickly and accurately identify risks in batch transaction data.

18 Claims, 4 Drawing Sheets

(51) Int. Cl.
*G06Q 30/06* (2012.01)
*G06F 16/28* (2019.01)
*G06Q 20/10* (2012.01)

(56) References Cited

U.S. PATENT DOCUMENTS

| | | | | |
|---|---|---|---|---|
| 7,398,925 B2 * | 7/2008 | Tidwell | | G06Q 20/042 |
| | | | | 235/440 |
| 7,458,508 B1 * | 12/2008 | Shao | | G06Q 20/04 |
| | | | | 235/380 |
| 7,562,814 B1 * | 7/2009 | Shao | | G06F 21/552 |
| | | | | 235/375 |
| 7,793,835 B1 | 9/2010 | Coggeshall et al. | | |
| 8,019,678 B2 * | 9/2011 | Wright | | G06Q 40/025 |
| | | | | 705/38 |
| 8,214,308 B2 * | 7/2012 | Chu | | G06N 5/02 |
| | | | | 706/14 |
| 8,489,499 B2 * | 7/2013 | Yan | | G06Q 10/067 |
| | | | | 705/38 |
| 8,527,418 B2 * | 9/2013 | Enzaldo | | G06Q 40/02 |
| | | | | 705/44 |
| 9,747,644 B2 * | 8/2017 | Cowen | | G06Q 20/4016 |
| 2010/0094767 A1 | 4/2010 | Miltonberger | | |
| 2010/0094768 A1 | 4/2010 | Miltonberger | | |
| 2010/0094791 A1 * | 4/2010 | Miltonberger | | G06Q 20/4016 |
| | | | | 706/46 |
| 2011/0196791 A1 * | 8/2011 | Dominguez | | G06Q 20/40 |
| | | | | 705/44 |
| 2012/0260135 A1 * | 10/2012 | Beck | | G06F 11/323 |
| | | | | 714/45 |
| 2014/0279387 A1 * | 9/2014 | Shifman | | G06Q 40/025 |
| | | | | 705/38 |
| 2015/0106260 A1 * | 4/2015 | Andrews | | G06Q 20/4016 |
| | | | | 705/39 |

FOREIGN PATENT DOCUMENTS

| | | | |
|---|---|---|---|
| CN | 102203724 | A | 9/2011 |
| CN | 103279883 | A | 9/2013 |
| CN | 103886495 | A | 6/2014 |
| CN | 104318268 | A | 1/2015 |
| CN | 104915842 | A | 9/2015 |
| CN | 105225116 | A | 1/2016 |
| CN | 105335815 | A | 2/2016 |
| CN | 105590055 | A | 5/2016 |
| CN | 105590156 | A | 5/2016 |
| CN | 105631746 | A | 6/2016 |
| JP | H08504284 | A | 5/1996 |
| KR | 20120050643 | A | 5/2012 |
| KR | 20150007940 | A | 1/2015 |
| KR | 101791623 | B1 | 10/2017 |
| WO | 2015161746 | A1 | 10/2015 |

OTHER PUBLICATIONS

Office Action for Korean Application No. 10-2019-7003200, dated Mar. 19, 2020, 9 pages.
First Search Report for Chinese Application No. 201610512684.2 dated Feb. 21, 2020, 1 page.
Office Action and Search Result for Taiwanese Application No. 106119330 dated Mar. 14, 2019 (5 pages).
Second Office Action for Chinese Application No. 201610512684.2 dated May 28, 2020.
Notice of Substantive Examination Result for Indonesian Application No. PID201810840 dated Sep. 17, 2019 (4 pages).
Search Report for European Application No. 17819192.0 dated Oct. 24, 2019 (6 pages).
International Search Report and Written Opinion for Application No. PCT/CN2017/089958 dated Jan. 4, 2018 (12 pages).
International Preliminary Report on Patentability for Application No. PCT/CN2017/089958 dated Jan. 1, 2019 (9 pages).

* cited by examiner

METHOD AND DEVICE FOR CONTROLLING DATA RISK

CROSS-REFERENCE TO RELATED APPLICATIONS

The present application is a continuation application of International Patent Application No. PCT/CN2017/089958, filed on Jun. 26, 2017, which is based on and claims priority to the Chinese Patent Application No. 201610512684.2, filed on Jul. 1, 2016 and entitled "Method and Device for Controlling Data Risk." The above-referenced applications are incorporated herein by reference in their entirety.

TECHNICAL FIELD

This invention relates to the technical field of the Internet, and in particular, to a method and device for controlling data risk.

BACKGROUND

With the rapid development of Internet technologies, electronic payments applications have become increasingly widespread. Here, the phrase "electronic payments" refers to actions of a payer, directly or by authorizing others, issuing a payment instruction through an electronic terminal to implement currency payment and funds transfer. Electronic payments can make people's daily lives more convenient, fast, and efficient.

To be able to determine security of funds during electronic payment processes, often a risk control system is used to conduct risk prevention and control for each electronic payment. A risk control system is typically made up of policy rules and payment models, and it mainly conducts real-time risk determination and risk decision-making for individual electronic payments. When it is determined that a given electronic payment has risk, a risk alert is performed, that is, the electronic payment with the risk is intercepted or cancelled to avoid financial losses to the user.

However, in the prevention and control process of the risk control system, malicious perpetrators often make payments by simulating the behavioral habits of normal electronic payments in each electronic payment, to dodge prevention and control by the risk control system. When executing electronic payments, malicious perpetrators may form a certain batch. Regarding batch electronic payments, because their electronic payment entities are distributed and the duration is long, when a risk control system is conducting prevention and control for single electronic payments, distributed electronic payments may not meet the risk control system's risk alert conditions. It is not possible to perform identification on distributed batch electronic payments, possibly directly leading to unnecessary financial losses for electronic payment users.

SUMMARY

This being the case, the embodiments of this invention provide a method and device for controlling data risk. The main objectives are to address the problem that in the current technologies, the risk control systems conducting risk prevention and control for single transaction data cannot perform risk identification on distributed batch transaction data, and to be able to quickly and accurately identify risks in batch transaction data.

To achieve this objective, this specification provides the following technical scheme:

This specification provides a data risk control method. According to one aspect of the specification, the method includes categorizing batch transaction data in a preset time period according to a first attribute, generating a graph indicator of a corresponding graph for each category of the batch transaction data according to a second attribute, the corresponding graph configured to identify risks in the batch transaction data, and inputting the graph indicators corresponding to different categories of the batch transaction data into corresponding risk identification models, and determining whether the batch transaction data corresponding to the input graph indicators has a risk based on results output by the models.

According to another aspect of the specification, a data risk control device is provided. The data risk control device may include a first categorization unit configured to categorize batch transaction data in a preset time period according to a first attribute, a first generation unit, configured to generate, according to a second attribute, a graph indicator of a corresponding graph for each category of the batch transaction data categorized by the first categorization unit, the corresponding graph configured to identify risks in the batch transaction data, an input unit configured to input the graph indicators generated by the first generation unit corresponding to different categories of the batch transaction data into corresponding risk identification models, and a determination unit configured to determine whether the batch transaction data corresponding to the input graph indicators has a risk based on results output by the models.

According to a further aspect, the specification provides a non-transitory computer-readable storage medium configured with instructions executable by one or more processors to cause the one or more processors to perform operations comprising categorizing batch transaction data in a preset time period according to a first attribute, generating a graph indicator of a corresponding graph for each category of the batch transaction data according to a second attribute, the corresponding graph configured to identify risks in the batch transaction data, inputting the graph indicators corresponding to different categories of the batch transaction data into corresponding risk identification models, and determining whether the batch transaction data corresponding to the graph indicators has a risk based on results output by the models.

According to another aspect, the specification provides a system for performing data risk control, comprising one or more processors and one or more non-transitory computer-readable memories coupled to the one or more processors and configured with instructions executable by the one or more processors to cause the system to perform operations comprising categorizing batch transaction data in a preset time period according to a first attribute, generating a graph indicator of a corresponding graph for each category of the batch transaction data according to a second attribute, the corresponding graph configured to identify risks in the batch transaction data, inputting the graph indicators corresponding to different categories of the batch transaction data into corresponding risk identification models, and determining whether the batch transaction data corresponding to the graph indicators has a risk based on results output by the models.

The embodiments disclosed in the specification have at least the following advantages:

In the method and device for controlling data risk, when a risk control setup/system performs risk control, first, it categorizes batch transaction data in a preset time period according to a first attribute. It generates a graph indicator of a corresponding graph for each category of the batch transaction data based on a second attribute, where the corresponding graph is configured to identify risks in the batch transaction data. It inputs the graph indicators corresponding to different categories of the batch transaction data into risk identification models, and based on the results output by the models, it determines whether the batch transaction data corresponding to the input graph indicators has a risk, facilitating the risk control setup/system to perform risk control for the risky batch transaction data corresponding to the graph indicators. By categorizing the batch transaction data formed by accumulating single transaction data in a preset time period, and by generating graph indicators, this invention is able to quickly and accurately identify collective risks in different categories of batch transaction data by using risk identification models, reducing unnecessary financial losses for users.

The preceding description is merely a summary of the technical scheme of this invention. For a clearer understanding of the technical means of this invention, to enable implementation of the technical means according to the content of the description, and also to make the abovementioned and other objectives, characteristics and advantages of this invention clearer and more straightforward, detailed embodiments of this invention are provided below.

BRIEF DESCRIPTION OF THE DRAWINGS

By reading the following detailed descriptions of preferred embodiments, various other advantages and benefits will become clear to those of ordinary skill in the art. The accompanying drawings are merely to illustrate the objectives of the preferred embodiments and not to limit this invention. Also, in the accompanying drawings as a whole, the same reference symbols represent the same parts. In the accompanying drawings.

DETAILED DESCRIPTION

Reference is made below to the accompanying drawings for a more detailed description of the exemplary embodiments of this disclosure. Even though exemplary embodiments of this disclosure are shown in the accompanying drawings, it should be understood that this disclosure may be achieved in a variety of forms and is not limited by the embodiments described herein. Conversely, these embodiments are provided for a more thorough understanding of this disclosure; they can fully convey the scope of this disclosure to those skilled in the art.

Figure 1:
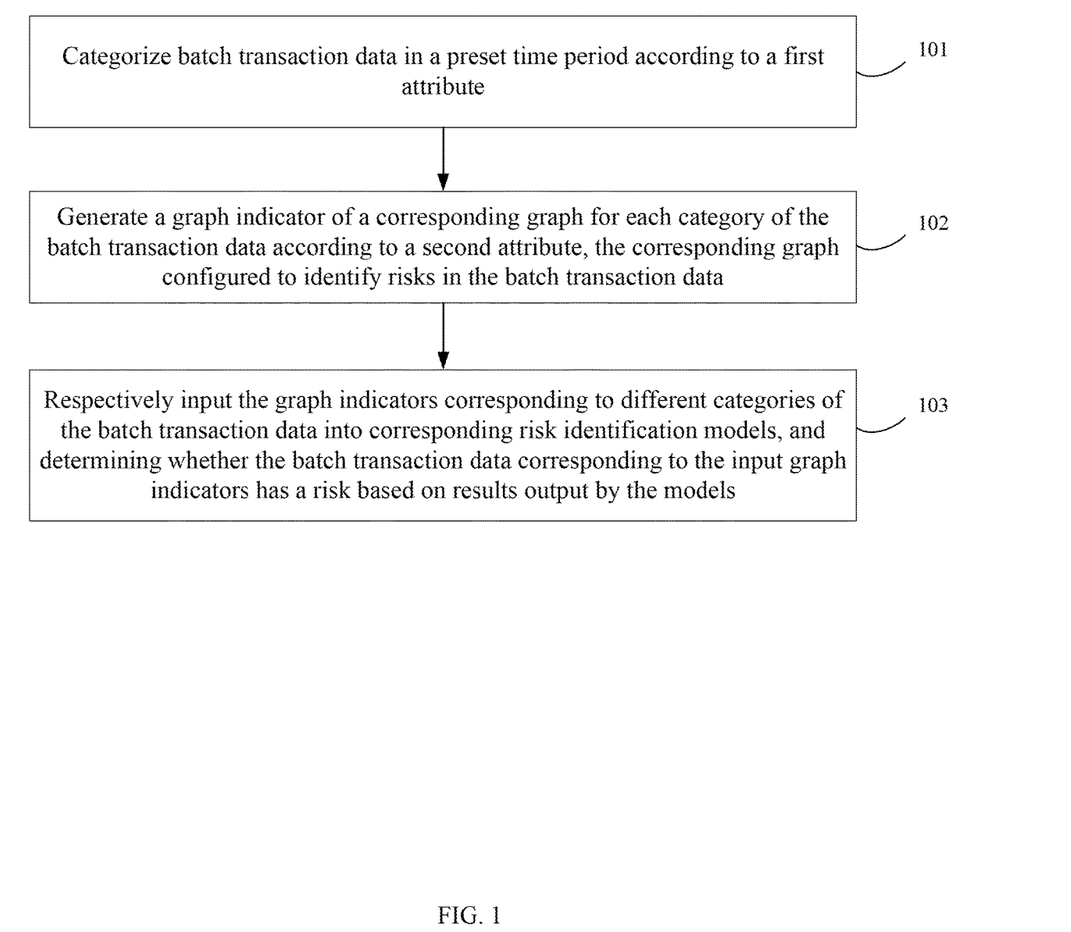
FIG. 1 is a flow diagram of a data risk control method provided by an embodiment of this invention.

The embodiments of this application provide a data risk control method. As shown in FIG. 1, according to some embodiments, the method comprises:

Step 101, categorizing batch transaction data in a preset time period according to a first attribute.

In the current technologies, risk control systems perform extremely rigorous risk control for data in each single transaction. However, during prevention and control process of the risk control systems, criminal groups often simulate the habits of normal users in performing single transaction data operations, to evade prevention and control by risk control systems. Here, the single transaction data is usually a user's funds flow data, e.g., bank transfers, online purchase payments, cross-platform fund payments, etc. However, in the process of committing these crimes, criminal groups use distributed entities and the duration is long. When a risk control system performs risk assessments or decision making for single transaction data, risk is distributed to each entity. However, the portion of risk for each entity may not reach an alert threshold of the risk control system. Therefore, a large portion of concentrated risk will be missed, resulting in unnecessary financial losses for users. In an exemplary application, the entity is a capital outflow party, which may comprise but is not limited to the following: a bank card, a registered account of a money transaction platform, etc. The embodiments of this invention has no limits on the entities corresponding to capital outflow parties.

Therefore, to address the problem in current technologies that only risks in single transaction data can be identified, and risks are prone to being missed, the embodiments of this invention use batch transaction data as a unit to identify batch transaction data risks. During the risk prevention and control process, the risk control system of the embodiments performs risk identification on batch transaction data, not on single transaction data. Therefore, prior to the prevention and control, the risk control system needs to accumulate single transaction data to obtain batch transaction data. Because there is a high volume of single transaction data recorded in a database, when obtaining batch transaction data, usually not all single transaction data in the database is accumulated. Rather, single transaction data in a given preset time period is accumulated to obtain batch transaction data. If the accumulated batch transaction data's volume is too large, the risk in the batch transaction data is likely to be "diluted," and when identifying risks in the batch transaction data, a large data volume will impede the identification of risks to a certain degree. If the accumulated batch transaction data's volume is too small, it can easily cause the batch transaction data to lack statistical significance of single transaction data, failing the objective of identifying risks in batch transaction data.

Due to the batch characteristic of the crimes when committed by a group, group crimes will inevitably have internal linkage. When categorizing batch transaction data according to a first attribute, for example, transaction data involving accounts registered in the same country, transactions involving the same kinds of products, transactions involving identical product receipt nations or regions and/or identical recipient account numbers each may be categorized into a category. The dimensions of the categorization may be decided based on the risky transactions. Different countries and regions will produce different forms of risks, which will lead to different categorization methods. Therefore, the embodiments of this invention "package" risks into given categories through the categorization of batch transaction data, determine the categories in which batch risk is concentrated, ensure the accuracy of risk identification in batch transaction data, and prevent risks from being missed, to avoid unnecessary, unknown financial losses for users. It must be stated that the first attribute is used merely for convenience of description, and does not refer to one attribute, but may include one or multiple attributes.

In an exemplary application, when a criminal illegally obtains a certain product, to profit from it, the criminal must dispose of the illegally obtained product. The online disposal of stolen products usually involves information such as types of the products (e.g., types such as phones and digital goods, automobiles, appliances, clothing, etc.), seller's region, and buyer's region, etc. Therefore, when the embodiments of this specification perform categorization according to a first attribute, the product type, the seller's region, or the buyer's region may be used as the first attribute. Sub-types (e.g., mobile phones, computers, women's wear, vehicle models, household appliances, etc.) and seller's city may also be used as the first attribute. The embodiments of this invention has no limitations on setting the first attribute.

In some embodiments, the objective of accumulating single transaction data in a preset time period is accumulating possible unknown risks in the single transaction data while collecting the single transaction data. In an exemplary application, single transaction data within a given day may be accumulated to obtain batch transaction data; or, single transaction data in three consecutive days may be accumulated to obtain batch transaction data; or single transaction data in a given week may be accumulated to obtain transaction data. The embodiments of this invention place no limitations on setting the preset time period.

Step 102, generating a graph indicator of a corresponding graph for each category of the batch transaction data according to a second attribute, the corresponding graph configured to identify risks in the batch transaction data.

After categorizing batch transaction data in Step 101, there may be one type of risk in the batch transaction data of the same category, there may be no risk, or there may be multiple types of risks. Therefore, it is necessary to separately conduct identification for the batch transaction data of the different categories and determine the risk.

To determine whether the batch transaction data in a given category has any risk, in some embodiments, risk identification models are used to identify whether risks exist in the batch transaction data of different categories. The risk identification models can be used to identify risks existing in batch transaction data based on a graph indicator. When a risk identification model performs a risk identification, an input to the risk identification model is a graph indicator of a graph established based on batch transaction data.

The objective of this step is to satisfy the risk identification models' requirements for the input data, generate graphs for the batch transaction data of different categories based on a second attribute, and obtain each graph's indicator based on the generated graphs. Here, second attribute is used merely for convenience of description. It may be one attribute or multiple attributes. For example, a graph may be established based on the attribute of the equipment involved in the transactions in the transaction data, or graphs may be established respectively for the batch transaction data of each category based on email and IP address. When graphs are generated for different batch transaction data, the second attribute may be the same or different. The second attribute may also be decided based on the actual situation. The first attribute and second attribute may be the same, or they may be different, or they may be partially the same. The graph indicators derived based on the graphs may include the number of nodes in the graph, the number of edges between associated the nodes, etc.

Step 103. inputting the graph indicators corresponding to different categories of the batch transaction data into corresponding risk identification models, and determining whether the batch transaction data corresponding to the input graph indicators has a risk based on results output by the models.

When determining whether a risk is present in batch transaction data, the graph indicators corresponding to batch transaction data of different categories are input into corresponding risk identification models, and the risk identification models determine whether risks are present in the batch transaction data corresponding to the input graph indicators.

When a risk identification model determines that a risk is present in batch transaction data based on the model's output results, it outputs the first attribute and second attribute of the risky batch transaction data corresponding to the graph indicator and the graph indicator corresponding to the determined risk, and provides them to the risk control system for reference in risk prevention and control and risk decision-making. That is, the risk prevention and control are conducted based on the first attribute, second attribute, and graph indicator, avoiding financial losses for users.

When the risk control system performs risk control, first, the data risk control method provided by the embodiments of this specification categorizes batch transaction data in a preset time period according to a first attribute, and generates a graph indicator of a corresponding graph for each category of the batch transaction data according to a second attribute, the corresponding graph configured to identify risks in the batch transaction data. The data risk control method inputs the graph indicators corresponding to different categories of the batch transaction data into corresponding risk identification models respectively, and based on the models' output results, it determines whether the batch transaction data corresponding to the input graph indicators has a risk, in order for the risk control system to perform risk control of risky batch transaction data corresponding to the graph indicators. By categorizing batch transaction data obtained by accumulating single transaction data in a preset time period and generating graph indicators, this invention is able to use risk identification models to quickly and accurately identify concentrated risks in the batch transaction data of different categories, reducing unnecessary financial losses for users.

The first attribute can vary according to different countries, regions, or transactions. The first attributes include, but are not limited to, nation, product model number, company name, vehicle brand, etc. As an example, assume that within a preset time period of Feb. 2, 2017, 00:00-24:00, there are 1000 pieces of single transaction data in a database to be categorized. At this time, the 1000 pieces of single transaction data are categorized according to a first attribute of receiving nation. Here, there are 300 pieces of single transaction data with a receiving nation of the United States, 400 pieces of single transaction data with a receiving nation of China, and 300 pieces of single transaction data with a receiving nation of the United Kingdom. Table 1 is a detailed record of the categorization information for the 1000 pieces of single transaction data in the database. As shown in Table 1, Table 1 details the categories determined according to the first attribute of receiving nation. Here, Table 1 is merely an illustrative example. The embodiments of this invention place no limits on the detailed record information of categorization.

TABLE 1

| Transaction date | Category | Receiving nation | Order no. | Notes |
|---|---|---|---|---|
| 2016 Feb. 17 | I | United States | 1001 | |
| 2016 Feb. 17 | I | United States | 1002 | |
| 2016 Feb. 17 | I | United States | . . . | |
| 2016 Feb. 17 | II | China | 1005 | |

TABLE 1-continued

| Transaction date | Category | Receiving nation | Order no. | Notes |
|---|---|---|---|---|
| 2016 Feb. 17 | II | China | 1010 | |
| 2016 Feb. 17 | II | China | . . . | |
| 2016 Feb. 17 | III | United Kingdom | 1026 | |
| 2016 Feb. 17 | III | United Kingdom | . . . | |

Furthermore, training batch transaction data is used to conduct training, to obtain general rules in risk identification models regarding the presence of risk in different categories of the training batch transaction data, i.e., preset risk thresholds corresponding to training graph indicators determined by performing preset processing operations on categorized training batch transaction data. Using this preset risk threshold, it is determined whether risk is present in the batch transaction data. The training batch transaction data is batch transaction data obtained through the accumulation of historical single transaction data in a preset time period. Therefore, to satisfy the requirements of risk identification models for input data, when generating, based on a second attribute, a graph indicator of a corresponding graph for each category of batch transaction data, configured to identify risks in batch transaction data in Step 102, preset processing operations are performed on categorized batch transaction data. At the same time, to a certain extent, performing preset processing operations on categorized batch transaction data may boost the speed and efficiency with which risk identification models identify risk. Here, the preset processing operations comprise: building a graph of correlations between single transaction data based on a second attribute, for the batch transaction data of every category, and deriving graph indicators from the graph for use in identifying batch transaction data risks.

In this embodiment, the objective of generating graph indicators according to a second attribute to identify batch transaction data risks for the batch transaction data of different categories is to determine whether there are inner connections between the single transaction data in the same category. This graph causes associations among single transaction data with the same second attribute. After building a complete graph, it is not possible to determine the degree of correlation between each pair of single transaction data. Therefore, it is necessary to generate a corresponding graph indicator based on the graph and input the graph indicator into a risk identification model, facilitating the risk identification model to use the graph indicator to identify batch transaction data risks.

Furthermore, when building graphs for different categories of batch transaction data based on a second attribute, the following methods may be used. For example, first, single transaction data with the same second attribute in the same category of batch transaction data is searched for, and association is established among the single transaction data with the same second attribute. Next, edges are constructed between associated single transaction data, and an edge distance value is set. Finally, a graph is built based on the edges and the edge distance value. When constructing a graph for batch transaction data of the same category, the graph may be constructed based on one second attribute, or a corresponding number of graphs may be constructed based on at least two second attributes. Under normal circumstances, there is a one-to-one correspondence between the number of second attributes and the number of graphs constructed. Under extreme circumstances, if it is determined that there is considerable error in the second attributes of the batch transaction data of different categories, it may make it impossible to find at least two pieces of single transaction data with the same second attribute in a category of batch transaction data. This type of situation rarely occurs. The embodiments of this invention place no limits on content and numbers of the second attribute, the number of graphs constructed for a single category, or the quantity of single transaction data in a graph.

In the embodiments of this invention, the determination of the second attribute must be based on actual content of the single transaction data in different categories. The second attribute may include, but is not limited to, the following: terminal equipment attribute, registered account on a shopping platform or money transaction platform, Internet Protocol (IP), recipient account number information/payment account number information, etc.

For example, as a characteristic of the batch commission of crimes, the criminal may bundle registered accounts on multiple money transaction platforms with the same bank card. For example, they may bundle registered accounts on different shopping platforms with one bank card; or they may bundle or use multiple bank cards of multiple users with the same registered account on a shopping website. For example, User I's shopping website registered account: abc@*.com, is simultaneously bundled with the bank cards of User A, User B, and User C. After User I steals the personal information (identification card, mobile phones number, bank card number) of User A, User B, and User C, the User I may carry out online payment actions, leading to financial losses for User A, User B, and User C. Therefore, when determining the second attribute to build graphs for batch transaction data, the second attribute may be determined based on indispensable steps taken by the criminal, such as information of the equipment or IP information used for conducting money transactions, money transaction platform account information, bank card information, etc.

It should be noted that after constructing the edges between associated data, an edge distance value must be set to "quantify" the edges in the graph, i.e., to quantify correlated single transaction data in the same category. The principle for setting the edge distance value is: if there is an association, based on the second attribute, between a pair of single transaction data, the distance value for the edge formed by the two pieces of single transaction data in the pair is set relatively low, for example, setting the edge distance value at 1, or setting the edge distance value at 2, etc. If there is no association, based on the second attribute, between a pair of single transaction data, it means that the two pieces of single transaction data in the pair are relatively independent of each other, and the edge distance value for these independent pieces of single transaction data is set relatively high, for example, setting the edge distance value at 1000, or setting the edge distance value at 5000, etc. The embodiments of this invention place no limitations on the numerical values at which edge distance values are set.

Figure 2:
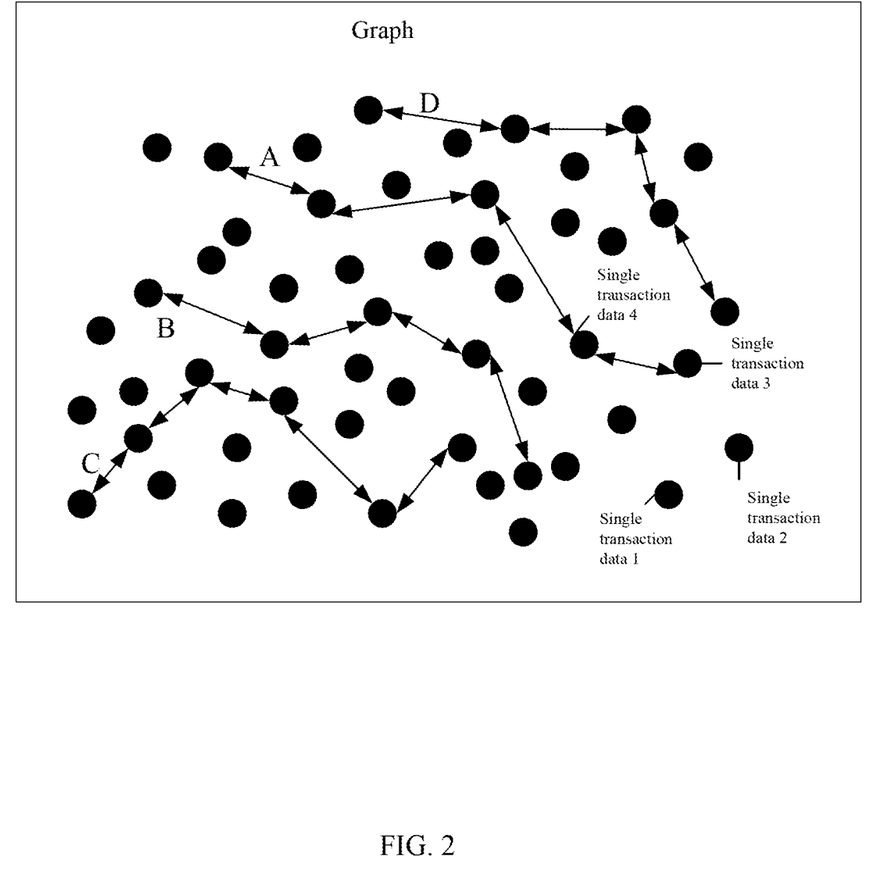
FIG. 2 is a diagram of a graph provided by an embodiment of this invention.

For example, taking the example shown in Table 1, a graph is constructed for the batch transaction data with a receiving nation of the United States, based on the following second attributes: recipient terminal equipment being smart phone, IP address, registered account of recipient money transaction platform, and recipient bank card type. FIG. 2 shows a diagram of a graph provided by an embodiment of this invention. As shown in FIG. 2, this is a graph based on the four second attributes. Here, A represents an association among the single transaction data based on recipient terminal equipment being smart phone, B represents an association among the single transaction data based on IP address, C represents an association among the single transaction data based on registered account of recipient money transaction platform, and D represents an association among the single transaction data based on recipient bank card type. In this graph, the edges shown by A, B, C, D each represents an association between the pieces of single transaction data forming the edge. The distance value for each edge between a pair of associated single transaction data is set at 2, and the distance value between a pair of unassociated single transaction data is set at 1000. For example, the distance values between single transaction data 1 and single transaction data 2, and between single transaction data 1 and single transaction data 3 are 1000 respectively; the distance value between single transaction data 3 and single transaction data 4 is 2; and the distance values between single transaction data 3 and single transaction data 1, and between single transaction data 3 and single transaction data 2 are 1000 respectively. It should be noted that FIG. 2 is merely an illustrative example. The embodiments of this invention place no limits on the second attributes, the number of pieces of associated single transaction data, the number of pieces of batch transaction data for a given category, or the distance value between each pair of single transaction data. For the construction of association graphs based on the second attributes for batch transaction data with a receiving nation of China and the United Kingdom, the second attributes and the method of constructing a graph based on second attributes are the same as for the batch transaction data with a receiving nation of the United States.

Furthermore, after constructing graphs based on second attributes, to help the risk identification system identify risks in the batch transaction data, corresponding graph indicators are derived from the constructed graphs. The process of deriving graph indicators comprises: parsing the graphs corresponding to different categories of the batch transaction data; determining the number of pieces of single transaction data in each category of the batch transaction data, the number of edges in the graph, and the corresponding edge distance values; and generating graph indicators based on the number of pieces of single transaction data, the number of edges in the graph, and the corresponding edge distance values.

The following is a detailed explanation of the graph indicators, to provide a better understanding. For a given category of batch transaction data, the batch transaction data includes associated single transaction data and unassociated, mutually independent single transaction data. When a graph is built for this category of batch transaction data based on the second attribute of terminal equipment attribute, the derived graph indicators comprise: average distance of edge distance values, closest distance of edge distance values, the number of pieces of single transaction data, single transaction data payment number entropy, and the average number of edges. Here, a smaller average distance for the edge distance values means a higher correlation between associated single transaction data, i.e., the more concentrated the payments are, and the higher the risk probability is. A higher average distance for the edge distance values means a smaller correlation between associated single transaction data, i.e., the more distributed the payments are, and the smaller the risk probability is. When the closest distance of the edge distance values is relatively small, it means that the two pieces of single transaction data are associated; when the closest distance of the edge distance values is relatively large, it means that the two pieces of single transaction data are not correlated and are independent of each other. Single transaction data payment number entropy is the entropy calculated for the number of payments of each account. A smaller entropy means that the payments in the association graph are concentrated in a few accounts; a larger entropy means that the payments in the graph are distributed. In the batch transaction data of different categories, a higher number of pieces of single transaction data means a higher number of payments in the batch transaction data of that category, and a higher risk probability. The average number of edges=the number of edges/$C_n^2$, where, n=the number of pieces of single transaction data. A higher average number of edges indicates that more pieces of single transaction data are correlated, i.e., payments are more concentrated, and a risk probability is higher.

Furthermore, prior to using a risk identification model to identify risks, it is necessary to perform training by using batch transaction data obtained from accumulated historical single transaction data in a preset time period, and build a risk identification model, to obtain preset risk thresholds corresponding to the graph indicators when risks are present in the training batch transaction data, and to ensure the accuracy of risk identification by the risk identification model. When building risk identification models, corresponding types of risk identification models may be built based on the categories of the training batch transaction data, comprising: categorizing the batch transaction data used in risk identification model training, building training graphs based on second attributes for different categories of training batch transaction data, generating corresponding training graph indicators based on the training graphs, using the training graph indicators to perform risk identification model training, and determining preset risk thresholds corresponding to the graph indicators of different categories of training batch transaction data based on the training results.

Here, training batch transaction data is similar to the aforementioned batch transaction data. Training batch transaction data is batch transaction data obtained from the accumulation of historical single transaction data in a preset time period; batch transaction data is obtained from the accumulation of single transaction data in a preset time period. Historical single transaction data is similar to the aforementioned single transaction data. Both are data of user funds flow, but there is an essential difference. The difference is: historical single transaction data is data from acknowledged and completed transactions, in which it is known whether any risk is involved. Transactions that have been completed and have risks cannot be recovered. Single transaction data may be data that is currently in the transaction process, and whether any risk is involved in it is unknown. Before the transaction is completed, it may be held or cancelled if a risk is discovered in the single transaction data, avoiding unnecessary financial losses for the user. For example, when the single transaction data is bank transfer data and the bank transfer funds have not yet been transferred to the destination account, if it is discovered during this process that the destination account may involve risks, the bank transfer is cancelled.

In some embodiments, even though the risks in historical single transaction data are known, when historical single transaction data is accumulated to form training batch transaction data, it is not possible to determine patterns or rules of the presence of risks in the training batch transaction data. Therefore, it is necessary to perform training on the training batch transaction data with existing risk, and summarize and determine preset risk thresholds of the graph indicators when risks are present. Based on these preset risk thresholds, the risk identification system performs risk prevention and control for the batch transaction data of transactions that have not been completed, ensuring the security of transaction data.

In an exemplary application, when deriving graph indicators and training graph indicators based on graphs, the calculated graph indicator or training indicator is a value, and the preset risk thresholds are based on the training graph indicators. Therefore, a preset risk threshold may be deemed as a variable in a risk identification model, assigning to this variable a value derived from the training graph indicator. When a risk identification model identifies whether a graph indicator exceeds a preset risk threshold, the value of the preset risk threshold is compared to the value of the graph indicator (variable). If they match, it means that the type of batch transaction data where the graph indicator exists is risky; if they do not match, it means that the type of batch transaction data where the graph indicator exists is not risky.

Furthermore, to achieve the method shown in FIG. 1, another embodiment of this invention provides a data risk control device. This device embodiment corresponds to the aforementioned method embodiment. The device of this embodiment is capable of implementing the full content of the method embodiment.

Figure 3:
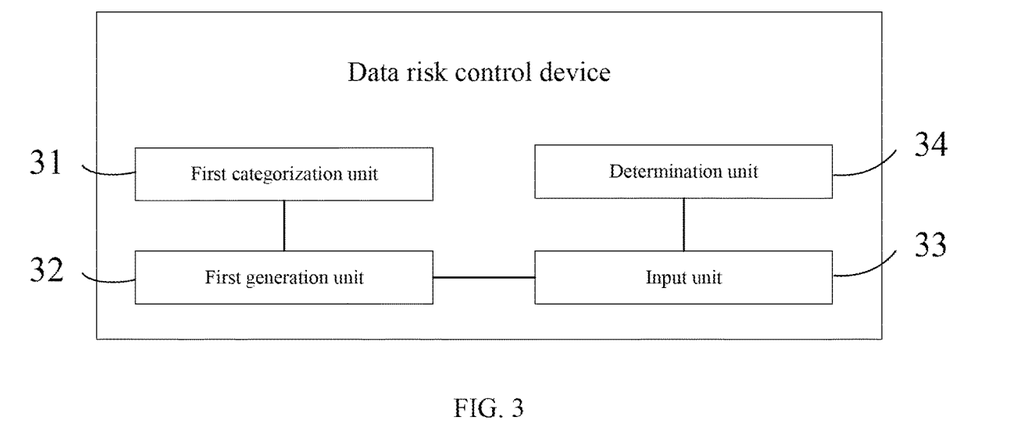
FIG. 3 is a composition block diagram of a data risk control device provided by an embodiment of this invention.

The embodiments of this invention provide a data risk control device. As shown in FIG. 3, according to one embodiment, the device comprises:

a first categorization unit 31, configured to categorize batch transaction data in a preset time period according to a first attribute;

a first generation unit 32, configured to generate, according to a second attribute, a graph indicator of a corresponding graph for each category of the batch transaction data categorized by the first categorization unit 31, the corresponding graph configured to identify risks in the batch transaction data;

an input unit 33, configured to input the graph indicators generated by the first generation unit 32 corresponding to different categories of the batch transaction data into corresponding risk identification models;

a determination unit 34, configured to determine whether the batch transaction data corresponding to the input graph indicators has a risk based on results output by the models.

Figure 4:
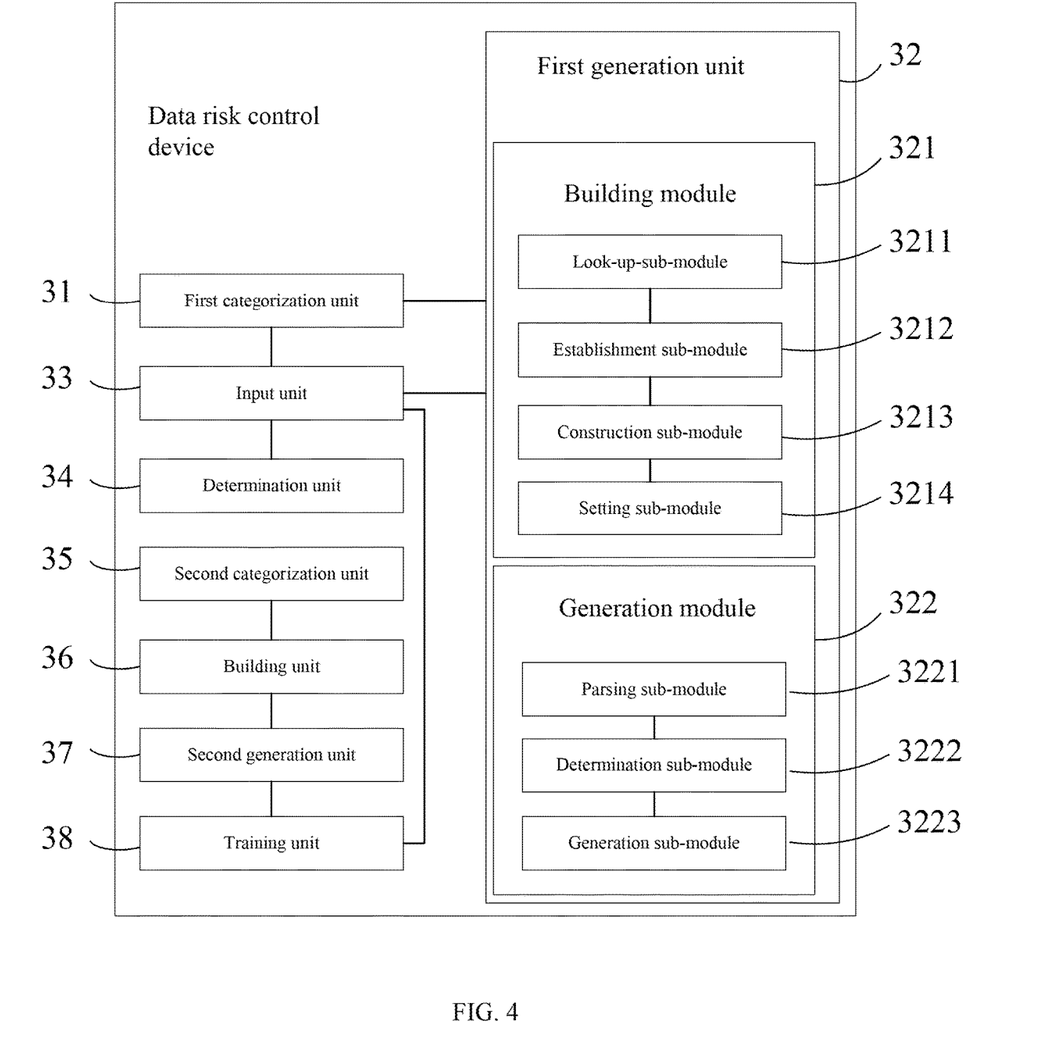
FIG. 4 is a composition block diagram of a data risk control device provided by another embodiment of this invention.

Furthermore, as shown in FIG. 4, the first generation unit 32 comprises:

a building module 321, configured to build a graph of associations among single transaction data for the each category of the batch transaction data, based on the second attribute;

a generation module 322, configured to generate a corresponding graph indicator based on the graph built by the building module 321.

Furthermore, as shown in FIG. 4, the building module 321 comprises:

a search sub-module 3211, configured to search for single transaction data with the same second attribute in the same category of batch transaction data;

an establishment sub-module 3212, configured to establish an association among the single transaction data with the same second attribute found by the search sub-module 3211;

a construction sub-module 3213, configured to construct edges among associated single transaction data, the association among the single transaction data established by the establishment sub-module 3212;

a setting module 3214, configured to set an edge distance value for edges constructed by the construction sub-module 3213.

Furthermore, as shown in FIG. 4, the generation module 322 comprises:

a parsing sub-module 3221, configured to parse the graph corresponding to the each category of the batch transaction data;

a determination sub-module 3222, configured to determine the number of pieces of single transaction data in the each category of the batch transaction data, the number of edges in the graph, and the edge distance value, during the process of the parsing sub-module's 3221 parsing the graphs corresponding to each category of batch transaction data;

a generation sub-module 3223, configured to generate the graph indicator based on the number of pieces of single transaction data, the number of edges in the graph, and the edge distance value determined by the determination sub-module 3222.

Furthermore, as shown in FIG. 4, the device also comprises:

a second categorization unit 35, configured to categorize training batch transaction data used for risk identification model training;

a building unit 36, configured to build, based on the first attribute, a training graph for each category of the training batch transaction data categorized by the second categorization unit 35; the training batch transaction data is batch transaction data obtained by accumulating historical single transaction data in a preset time period;

a second generation unit 37, configured to generate corresponding training graph indicators based on the training graphs built by the building unit 36;

a training unit 38, configured to use the training graph indicators generated by the second generation unit 37 to perform the risk identification model training.

When the risk control setup/system performs risk control, first, the data risk control device provided by this invention categorizes batch transaction data in a preset time period according to a first attribute, and generates a graph indicator of a corresponding graph for each category of the batch transaction data according to a second attribute, the corresponding graph configured to identify risks in the batch transaction data. The data risk control device inputs the graph indicators corresponding to different categories of the batch transaction data into corresponding risk identification models respectively, and based on the models' output results, it determines whether the batch transaction data corresponding to the input graph indicators has a risk, in order for the risk control setup/system to perform risk control of risky batch transaction data corresponding to the graph indicators. By categorizing batch transaction data obtained by accumulating single transaction data in a preset time period and generating graph indicators, this invention is able to use risk identification models to quickly and accurately identify concentrated risk in the batch transaction data of different categories, reducing unnecessary financial losses for users.

The data risk control device comprises a processor and memory. The first categorization unit, generation unit, input unit, and determination unit are program units stored in the memory. The processor executes the program units stored in the memory to achieve corresponding functions. For example, the processor executes the program units stored in the memory to perform the above-described methods.

The processor comprises a kernel, and the kernel retrieves corresponding program units from the memory. There may be one or more kernels. By adjusting the kernel parameters to solve the problem that in the current technologies, risk control systems conducting risk prevention and control by using single transaction data as a unit cannot perform risk identification for distributed batch transaction data, it is able to quickly and accurately identify batch transaction data risks.

The memory may comprise the forms of volatile memory on computer-readable media, random access memory (RAM), and/or non-volatile RAM, such as read-only memory (ROM) or flash RAM. The memory comprises at least one storage chip.

This application also provides a computer program product. When it is executed on a data processing device, it is suitable for executing and initializing program code with the following method steps: categorizing batch transaction data in a preset time period according to a first attribute; generating a graph indicator of a corresponding graph for each category of the batch transaction data according to a second attribute, the corresponding graph configured to identify risks in the batch transaction data; inputting the graph indicators corresponding to different categories of the batch transaction data into corresponding risk identification models, and determining whether the batch transaction data corresponding to the input graph indicators has a risk based on results output by the models.

Those skilled in the art shall understand that the embodiments of this application may be provided as a method, system, or computer program product. Therefore, this application may employ a purely hardware embodiment form, a purely software embodiment form, or an embodiment form that combines software and hardware. Also, this application may employ the form of a computer program product achieved through computer storage media (including but not limited to magnetic disc memory, CD-ROM, optical memory, etc.) comprising computer-executable program code in one or more of these.

The application provides descriptions in reference to flow diagrams and/or block diagrams of methods, devices, and computer program products according to embodiments of this application. It should be understood that every flow and/or block in the flow diagrams and/or block diagrams, as well as combinations of the flows and/or blocks in the flow diagrams and/or block diagrams, may be achieved through computer program instructions. These computer program instructions may be provided to the processor of a general-purpose computer, specialized computer, embedded processor, or other programmable data processing device to produce a machine, causing the instructions executed by the processor of a computer or other programmable data processing device to produce a device configured to achieve the functions designated in one or more flows of a flow diagram and/or one or more blocks of a block diagram.

These computer program instructions can also be stored in computer-readable memory that can cause a computer or other programmable data processing device to operate in a given mode, causing the instructions stored in this computer-readable memory to become a product comprising an instruction apparatus. This instruction apparatus achieves the functions specified in one or more flows of a flow chart and/or one or more blocks of a block diagram.

These computer program instructions can also be loaded onto a computer or other programmable data processing device, enabling the execution of a series of operation steps on the computer or other programmable device to produce computer processing. In this way, the instructions executed on the computer or other programmable device provide steps for achieving the specified functions of one or more flows in a flow chart and/or one or more blocks in a block diagram.

In one typical configuration, the computation equipment comprises one or more processors (CPUs), input/output interfaces, network interfaces, and internal memory.

The memory may comprise the forms of volatile memory on computer-readable media, random access memory (RAM), and/or non-volatile RAM, such as read-only memory (ROM) or flash RAM. Memory is an example of computer-readable media.

Computer-readable media include permanent, nonpermanent, mobile, and immobile media, which can achieve information storage through any method or technology. The information may be computer-readable instructions, data structures, program modules, or other data. Examples of computer storage media include, but are not limited to, Phase-change RAM (PRAM), Static RAM (SRAM), Dynamic RAM (DRAM), other types of Random Access Memory (RAM), Read-Only Memory (ROM), Electrically Erasable Programmable Read-Only Memory (EEPROM), flash memory or other internal memory technologies, Compact Disk Read-Only Memory (CD-ROM), Digital Versatile Discs (DVD) or other optical memories, cassettes, magnetic tape and disk memories or other magnetic memory devices, or any other non-transmission media, which can be used for storing information that can be accessed by a computation device. According to the definitions herein, computer-readable media exclude transitory computer-readable media (transitory media), such as modulated data signals and carriers.

The preceding is merely embodiments of this application, and not used to limit this application. Various modifications and changes to this application are available to those skilled in the art. All revisions, equivalent substitutions, and improvements made within the spirit and principles of this application shall fall within the scope of protection of this application.

The invention claimed is:
1. A data risk control method, comprising:
categorizing batch transaction data in a preset time period according to a first attribute;
generating a graph indicator of a corresponding graph for each category of the batch transaction data according to a second attribute, the corresponding graph configured to identify risks in the batch transaction data, wherein the generating a graph indicator comprises:
building, based on the second attribute, a graph of associations among single transaction data for the each category of the batch transaction data; and
generating a corresponding graph indicator based on the graph,
wherein the building a graph comprises:
searching for single transaction data with the same second attribute in the same category of the batch transaction data;
establishing an association among the single transaction data with the same second attribute; and
constructing edges among associated single transaction data, and setting an edge distance value for the edges; and
wherein the generating a corresponding graph indicator comprises:
parsing the graph corresponding to the each category of the batch transaction data;
determining a number of pieces of single transaction data in the each category of the batch transaction data, a number of edges in the graph, and the edge distance value; and generating the graph indicator based on the number of pieces of single transaction data, the number of edges in the graph, and the edge distance value;

inputting the graph indicators corresponding to different categories of the batch transaction data into corresponding risk identification models;

determining whether the batch transaction data corresponding to the graph indicators has a risk based on results output by the models;

categorizing training batch transaction data used for risk identification model training, and building, based on the first attribute, a training graph for each category of the training batch transaction data, wherein the training batch transaction data is batch transaction data obtained by accumulating historical single transaction data in a preset time period;

generating corresponding training graph indicators based on the training graphs; and using the training graph indicators to perform the risk identification model training.

2. A non-transitory computer-readable storage medium configured with instructions executable by one or more processors to cause the one or more processors to perform operations comprising:

categorizing batch transaction data in a preset time period according to a first attribute;

generating a graph indicator of a corresponding graph for each category of the batch transaction data according to a second attribute, the corresponding graph configured to identify risks in the batch transaction data, wherein the generating a graph indicator comprises:

building, based on the second attribute, a graph of associations among single transaction data for the each category of the batch transaction data; and generating a corresponding graph indicator based on the graph, wherein the building a graph comprises:

searching for single transaction data with the same second attribute in the same category of the batch transaction data;

establishing an association among the single transaction data with the same second attribute; and constructing edges among associated single transaction data, and setting an edge distance value for the edges; and wherein the generating a corresponding graph indicator comprises:

parsing the graph corresponding to the each category of the batch transaction data;

determining a number of pieces of single transaction data in the each category of the batch transaction data, a number of edges in the graph, and the edge distance value; and generating the graph indicator based on the number of pieces of single transaction data, the number of edges in the graph, and the edge distance value;

inputting the graph indicators corresponding to different categories of the batch transaction data into corresponding risk identification models;

determining whether the batch transaction data corresponding to the graph indicators has a risk based on results output by the models;

categorizing training batch transaction data used for risk identification model training, and building, based on the first attribute, a training graph for each category of the training batch transaction data, wherein the training batch transaction data is batch transaction data obtained by accumulating historical single transaction data in a preset time period;

generating corresponding training graph indicators based on the training graphs; and using the training graph indicators to perform the risk identification model training.

3. A system for performing data risk control, comprising one or more processors and one or more non-transitory computer-readable memories coupled to the one or more processors and configured with instructions executable by the one or more processors to cause the system to perform operations comprising:

categorizing batch transaction data in a preset time period according to a first attribute;

generating a graph indicator of a corresponding graph for each category of the batch transaction data according to a second attribute, the corresponding graph configured to identify risks in the batch transaction data, wherein the generating a graph indicator comprises:

building, based on the second attribute, a graph of associations among single transaction data for the each category of the batch transaction data; and generating a corresponding graph indicator based on the graph, wherein the building a graph comprises:

searching for single transaction data with the same second attribute in the same category of the batch transaction data;

establishing an association among the single transaction data with the same second attribute; and constructing edges among associated single transaction data, and setting an edge distance value for the edges; and wherein the generating a corresponding graph indicator comprises:

parsing the graph corresponding to the each category of the batch transaction data;

determining a number of pieces of single transaction data in the each category of the batch transaction data, a number of edges in the graph, and the edge distance value; and generating the graph indicator based on the number of pieces of single transaction data, the number of edges in the graph, and the edge distance value;

inputting the graph indicators corresponding to different categories of the batch transaction data into corresponding risk identification models;

determining whether the batch transaction data corresponding to the graph indicators has a risk based on results output by the models;

categorizing training batch transaction data used for risk identification model training, and building, based on the first attribute, a training graph for each category of the training batch transaction data, wherein the training batch transaction data is batch transaction data obtained by accumulating historical single transaction data in a preset time period;

generating corresponding training graph indicators based on the training graphs; and using the training graph indicators to perform the risk identification model training.

4. The method of claim 1, further comprising: determining preset risk thresholds corresponding to the graph indicators of different categories of the training batch transaction data based on the training results.

5. The method of claim 4, wherein the determining whether the batch transaction data corresponding to the graph indicators has a risk based on results output by the models comprises:
comparing values of the preset risk thresholds with values of the graph indicators.

6. The method of claim 1, wherein each of the graph indicators comprises: an average distance of edge distance values, a closest distance of the edge distance values, the number of pieces of single transaction data, single transaction data payment number entropy, and an average number of edges; and wherein an increased average distance of the edge distance values corresponds to an increased risk probability, and an increased average number of edges corresponds to an increased risk probability.

7. The method of claim 1, wherein an edge is formed by two pieces of single transaction data in a pair, and the setting a n edge distance value for the edges comprising:
setting a first edge distance value for a first edge of a pair of the single transaction data that is correlated to each other to be less than a second edge distance value for a second edge of a pair of the single transaction data that is not correlated.

8. The method of claim 1, wherein the first attribute includes one or more of: a receiving nation, product model number, a company name, and a vehicle brand; and the second attribute includes one or more of: a terminal equipment attribute, a registered account on a shopping platform, a registered account on a money transaction platform, Internet Protocol (IP), recipient account number information, and payment account number information.

9. The non-transitory computer-readable storage medium of claim 6, wherein the operations further comprise: determining preset risk thresholds corresponding to the graph indicators of different categories of the training batch transaction data based on the training results.

10. The non-transitory computer-readable storage medium of claim 9, wherein the determining whether the batch transaction data corresponding to the graph indicators has a risk based on results output by the models comprises:
comparing values of the preset risk thresholds with values of the graph indicators.

11. The non-transitory computer-readable storage medium of claim 2, wherein each of the graph indicators comprises: an average distance of edge distance values, a closest distance of the edge distance values, the number of pieces of single transaction data, single transaction data payment number entropy, and an average number of edges; and wherein an increased average distance of the edge distance values corresponds to an increased risk probability, and an increased average number of edges corresponds to an increased risk probability.

12. The non-transitory computer-readable storage medium of claim 2, wherein an edge is formed by two pieces of single transaction data in a pair, and the setting an edge distance value for the edges comprising:
setting a first edge distance value for a first edge of a pair of the single transaction data that is correlated to each other to be less than a second edge distance value for a second edge of a pair of the single transaction data that is not correlated.

13. The non-transitory computer-readable storage medium of claim 2, wherein the first attribute includes one or more of: a receiving nation, product model number, a company name, and a vehicle brand; and the second attribute includes one or more of: a terminal equipment attribute, a registered account on a shopping platform, a registered account on a money transaction platform, Internet Protocol (IP), recipient account number information, and payment account number information.

14. The system of claim 3, wherein the operations further comprise: determining preset risk thresholds corresponding to the graph indicators of different categories of the training batch transaction data based on the training results.

15. The system of claim 14, wherein the determining whether the batch transaction data corresponding to the graph indicators has a risk based on results output by the models comprises:
comparing values of the preset risk thresholds with values of the graph indicators.

16. The system of claim 3, wherein each of the graph indicators comprises: an average distance of edge distance values, a closest distance of the edge distance values, the number of pieces of single transaction data, single transaction data payment number entropy, and an average number of edges; and wherein an increased average distance of the edge distance values corresponds to an increased risk probability, and an increased average number of edges corresponds to an increased risk probability.

17. The system of claim 3, wherein an edge is formed by two pieces of single transaction data in a pair, and the setting an edge distance value for the edges comprising:
setting a first edge distance value for a first edge of a pair of the single transaction data that is correlated to each other to be less than a second edge distance value for a second edge of a pair of the single transaction data that is not correlated.

18. The system of claim 3, wherein the first attribute includes one or more of: a receiving nation, product model number, a company name, and a vehicle brand; and the second attribute includes one or more of: a terminal equipment attribute, a registered account on a shopping platform, a registered account on a money transaction platform, Internet Protocol (IP), recipient account number information, and payment account number information.

* * * * *